United States Patent [19]

Aftergut et al.

[11] Patent Number: 4,624,532
[45] Date of Patent: * Nov. 25, 1986

[54] DICHROIC LIQUID CRYSTAL COMPOSITIONS CONTAINING ANTHRAQUINONE-BASED DYES

[75] Inventors: Sigfried Aftergut, Schenectady; Herbert S. Cole, Scotia, both of N.Y.

[73] Assignee: General Electric Company, Schenectady, N.Y.

[*] Notice: The portion of the term of this patent subsequent to Oct. 26, 1999 has been disclaimed.

[21] Appl. No.: 402,397

[22] Filed: Jul. 27, 1982

Related U.S. Application Data

[62] Division of Ser. No. 199,589, Oct. 22, 1980, Pat. No. 4,356,102.

[51] Int. Cl.$^4$ ............................ G02F 1/13; C09K 3/34
[52] U.S. Cl. ................................... 350/349; 252/299.1
[58] Field of Search .................. 252/299.1; 350/350 R, 350/349

[56] References Cited

U.S. PATENT DOCUMENTS

| | | | |
|---|---|---|---|
| 2,628,963 | 2/1953 | Laucius et al. | 252/299.1 |
| 3,864,022 | 2/1975 | Moriyama et al. | 252/299.1 |
| 3,960,750 | 6/1976 | Moriyama et al. | 252/299.1 |
| 4,211,473 | 7/1980 | Shanks | 252/299.1 |
| 4,232,949 | 11/1980 | Huffman | 252/299.1 |
| 4,232,950 | 11/1980 | Benham | 252/299.1 |
| 4,299,720 | 11/1981 | Osman et al. | 252/299.1 |
| 4,356,102 | 10/1982 | Aftergut et al. | 252/299.1 |
| 4,394,070 | 7/1983 | Brown et al. | 252/299.1 |

FOREIGN PATENT DOCUMENTS

| | | | |
|---|---|---|---|
| 2104 | 5/1979 | European Pat. Off. | 252/299.1 |
| 38460 | 10/1980 | European Pat. Off. | 252/299.1 |
| 2920730 | 11/1979 | Fed. Rep. of Germany | 252/299.1 |
| 2902177 | 7/1980 | Fed. Rep. of Germany | 252/299.1 |
| 55-127485 | 10/1980 | Japan | 252/299.1 |
| 57-34177 | 2/1982 | Japan | 252/299.1 |
| 57-117580 | 7/1982 | Japan | 252/299.1 |
| 2037803 | 7/1980 | United Kingdom | 252/299.1 |
| 2045274 | 10/1980 | United Kingdom | 252/299.1 |

OTHER PUBLICATIONS

Seki, H. et al., Abstracts of the 8th International Liquid Crystal Conf., Kyoto, Japan, L-1P (Jun. 30-Jul. 4, 1980).

Uchida, T. et al., Mol. Cryst. Liq. Cryst., vol. 63, pp. 19-44, (1981).
Aftergut, S. et al., Mol. Cryst. Liq. Cryst., vol. 78, pp. 271-277, (1981).
Cox, R. J., Mol. Cryst. Liq. Cryst., vol. 55, pp. 1-32 (1979).

Primary Examiner—Teddy S. Gron
Attorney, Agent, or Firm—William A. Teoli; James C. Davis, Jr.; James Magee, Jr.

[57] ABSTRACT

Liquid crystal compositions having guest anthraquinone-based dyes dissolved therein, are disclosed. The anthraquinone-based dyes have the general formula:

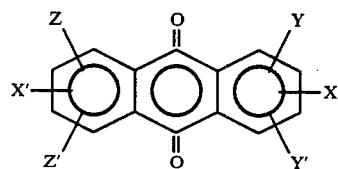

wherein at least one of X and X' is a 5-membered ring connected to the lateral positions of the lateral benzene rings in the anthraquinone molecule, the five membered ring having the structure:

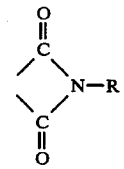

wherein R is an alkoxy alkyl radical, a straight chain or branched chain alkyl radical, a phenyl radical, a benzyl radical and/or substituted derivatives of the foregoing radicals. The anthraquinone-based dyes of the invention may be used alone or with other compatible dyes as guest dyes to form various colors for coloring the host liquid crystal compositions. One preferred class of guest anthraquinone-based dyes which are dissolved in the host liquid crystal material, are various derivatives of 1,4-diamino-2,3-anthraquinone-dicarboximide.

13 Claims, No Drawings

DICHROIC LIQUID CRYSTAL COMPOSITIONS CONTAINING ANTHRAQUINONE-BASED DYES

This application is a division of application Ser. No. 199,589, filed Oct. 22, 1980, now U.S. Pat. No. 4,356,102.

This invention relates to liquid crystal compositions, and more particularly, to dichroic liquid crystal compositions containing anthraquinone-based dyes.

Liquid crystals are conventionally used in conjunction with one or more dyes to obtain improved colors when liquid crystals are used in liquid crystal displays. In such cases, a host liquid crystal composition comprises a host liquid crystal material and guest dye dissolved in the host liquid crystal material. The guest dyes which may be used alone or in combination with other dyes to achieve a desired color, preferably have certain properties which enhance their use in liquid crystal compositions. These properties include dichroism, solubility of the dye in the liquid crystal and high order parameter.

Dichroism is the property whereby an oriented assembly of dye molecules exhibit relatively low absorption of a given wavelength in one state of orientation and a relatively high absorption of the same wavelength in another state of orientation with respect to the light source. The orientation can be brought about by dissolution of the dye in a liquid crystal solvent.

Solubility must be sufficiently high so that thin layers, for example, of ten micrometers, have adequate light absorption in one of the oriented states. In certain instances, the solubility of a particular dye may be relatively low, however, the dye may still be used in conjunction with other dyes which are also soluble in the liquid crystal host so that there is adequate light absorption in one of the oriented states.

Order parameter is a quantative measure of the degree of molecular order or alignment in a given system. High order parameter is promoted by dyes with elongated shape having a large ratio of molecular length to breadth, similar to the shape of the molecules of a liquid crystal host material. To insure an elongated shape, the molecules should have a rigid structure. The brightness and contrast are both related to the order parameter, normally designated as S, of the dye, where $S=(R-1)/(R+2)$, and R is the ratio of light absorption in the dye measured with a polarizer respectively parallel and perpendicular to the nematic director of the liquid crystal host at the wavelength of maximum absorption. Advantageously, the order parameter should be at least 0.60, and preferably, as high as possible, to achieve a minimum desired contrast ratio while still allowing a liquid crystal guest-host display to be fabricated with a reasonable brightness parameter.

The eye is sensitive to radiation in the 400–700 nm wavelength range, however, there are few dyes which absorb radiation above about 650 nm which are also compatible with liquid crystal materials and which have a sufficient order parameter, S.

To fabricate a dichroic liquid crystal display with a neutral black color, for example, the radiation present in a source of illumination, such as, daylight, incandesent lamps or fluorescent lamps, to which the eye is sensitive, must be absorbed to a substantial degree at all wavelengths from 400–700 nm. To make a good blue-colored or green-colored dichroic liquid crystal display, radiation in the 600–700 nm range must also be substantially absorbed to prevent a reddish hue since radiation in the 600–700 nm range is perceived as red. If the absorption of a dichroic liquid crystal in the 600–700 nm range is insufficient, black and blue displays have a reddish hue, and green displays do not have a pleasing green appearance. In order to overcome this problem it is necessary to provide blue dyes having an absorption peak at wavelengths greater than about 650 nm, with a sufficient order parameter, for example, above about 0.60, and with sufficient solubility in liquid crystal compositions.

Blue dichroic dyes of the azo and anthraquinone types are well known in the prior art. Blue azo dyes of high order parameter and absorption peak at 595–610 nm are commercially available. These dyes also absorb at wavelengths greater than 610 nm, but the absorption at the higher wavelengths is relatively low. One anthraquinone dye, commercially available under the trade name *Waxoline Green G*, has an absorption peak of about 650 nm, however, this dye has a low order parameter of only about 0.4 to 0.45 and is therefore not satisfactory for making liquid crystal displays of good black, blue or green colors.

Other commercially available anthraquinone dyes, such as dye D-27 sold by B. D. H. Chemicals, have better order parameter, for example, 0.60 to 0.66, however, the peak absorption of such dyes is less than that of the *Waxoline Green G* described above, the peak absorption dye of D-27 being about 612 nm. Another anthraquinone dye, 4,8-diamino-1,5-dihydroxy-3-(4-heptyloxyphenyl) anthraquinone, produced by Hoffman-LaRoche Company, has an order parameter of 0.74 with peak absorption at 645 nm. This is an improvement over previous anthraquinone-based dyes, however, it does not effectively absorb light beyond 650 nm to produce the desirable features and effects expressed above.

A blue anthraquinone-based dye known as 1,4-di-n-butylamino anthraquinone is used in conjunction with other dyes in U.S. Pat. No. 3,864,022 and U.S. Pat. No. 3,960,750. This dye is used in conjunction with liquid crystal molecules, however, it has a peak absorption of less than 650 nm and a relatively low order parameter. Other photostable anthraquinone pleochroic dyes have been disclosed by B. D. H. Chemicals Limited, Poole, Dorset, however, such dyes have absorption peaks less than 650 nm and generally have relatively low order parameters, that is, $S = <0.60$.

Blue dyes of the anthraquinone series suitable for the coloring of polyethylene terephthalate fibers known as "Dacron", are described in U.S. Pat. No. 2,628,963. The dyes in U.S. Pat. No. 2,628,963 are the 1,4-diamino-2,3-anthraquinone-dicarboximides. These dyes are used in the dyeing of such fibers as "Dacron" in blue shades, and they result in colored fibers having excellent light-fastness and gas-fume fastness. There is no disclosure in U.S. Pat. No. 2,628,963 relative to the use of the anthraquinone series of dyes disclosed therein in liquid crystal compositions.

Accordingly, it is the primary object of this invention to provide liquid crystal compositions which overcome the disadvantages discussed above.

It is another object of this invention to provide a liquid crystal composition containing blue dye with an absorption peak at wavelengths greater than 650 nm and with an order parameter greater than 0.60.

Another object of this invention is to provide an improved dichroic liquid crystal formulation containing anthraquinone-based dyes with absorption peaks at wavelengths greater than 650 nm.

Still another object of this invention is to provide a dichroic liquid crystal composition containing a plurality of dyes including at least one anthraquinone-based dye having a maximum absorption peak at a wavelength greater than 650 nm and an order parameter greater than 0.60.

These and other objects are accomplished by dissolving anthraquinone-based dyes having absorption at wavelengths greater than 650 nm and an order parameter greater than 0.60 in a liquid crystal host material. A guest anthraquinone-based dye having a five-membered, N-substituted dicarboximide ring structure joined to the two lateral carbon atoms of at least one lateral benzene ring of the anthraquinone molecule is dissolved in a host liquid crystal material to color the liquid crystal material. The carbon atoms of the two carbonyl groups of the dicarboximide are bonded respectively to the two lateral carbon atoms of the lateral benzene ring to form the five-membered ring.

In accordance with the present invention, there is provided a liquid crystal composition comprising a host liquid crystal material and a guest anthraquinone dye dissolved in said host liquid crystal material, the anthraquinone dye having the general formula:

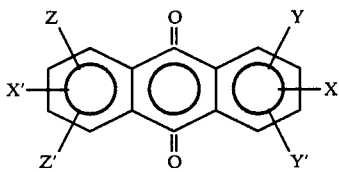

wherein at least one of X and X' is a five-membered ring connected to the two lateral positions of the lateral benzene rings in the anthraquinone molecule, the five-membered ring having the structure:

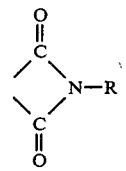

wherein R is selected from the group consisting of alkoxyalkyl radical, straight chain or branched chain alkyl radical having from one to about ten carbon atoms and halogen, amino and nitro derivatives thereof, phenyl radical, substituted phenyl radical, benzyl radical and substituted benzyl radical, wherein the substituted phenyl and substituted benzyl radicals are substituted with halogen, cyano, nitro, alkoxy, phenol, amino, alkylamino, dialkylamino, alkyl radical wherein the alkyl is from one to about ten carbon atoms, arylamino and ester having the formula:

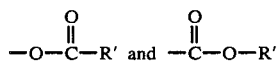

wherein R' is selected from the group consisting of alkyl radical, substituted alkyl radical, aryl and substituted aryl; and wherein Y, Y', Z and Z' are one of the following substituents: hydrogen, amino, alkylamino, dialkylamino, nitro, alkyl radical having from about one to ten carbon atoms, substituted alkyl radical having from about one to about ten carbon atoms, halogen, cyano and hydroxy.

By dissolving at least one guest anthraquinone dye in a host liquid crystal material, the guest anthraquinone dye having the general formula:

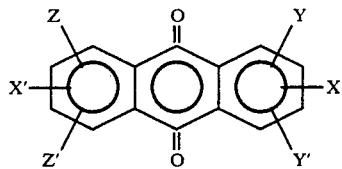

wherein X, X', Y, Y', Z and Z' are defined above, in at least one host liquid crystal material, improved liquid crystal compositions having improved color because of the maximum absorption peak or maximum absorption peaks greater than 650 nm and the high order parameter of the guest anthraquinone-based dye or dyes are obtained. In accordance with the present invention, improved black liquid crystal displays and improved blue liquid crystal displays have been prepared without a reddish hue, and green liquid crystal displays have been prepared with a more pleasing green appearance. In accordance with the present invention, dichroic liquid crystal compositions containing dyes with an absorption peak at a wavelength greater than 650 nm and with an order parameter of at least 0.60 have been prepared and produce improved colors in liquid crystal displays.

Although there is no intention of being limited to any particular theory, it appears that the elongation of the dye molecule in a symmetrical fashion along the major axis of the anthraquinone nucleus results in the improved performance of the dyes of the invention in liquid crystal materials. The major axis is the axis or line which divides and passes through the three consecutive benzene rings of the anthraquinone molecule and continues through the N—R in the dicarboximide group attached to the lateral benzene ring. Thus, the anthraquinone dye molecule is elongated by the 5-membered ring attached to the two lateral carbon atoms of one or both of the lateral benzene rings. The dye is further elongated by substituting various groups upon the nitrogen atom of the dicarboximide ring structure.

The basic dye molecule showing numbered substitution atoms of the anthraquinone-based dyes of the present invention is shown below wherein a dicarboximide is attached to the two lateral carbon atoms of one of the lateral benzene rings of the anthraquinone-based dye structure.

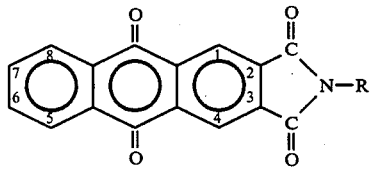

The anthraquinone-based dye structure is represented by the three adjacent benzene rings in the above molecular configuration. The dicarboximide is joined to one of the lateral benzene rings at the outermost (the two lateral) carbon atoms designated as carbon atom number 2 and carbon atom number 3. Thus, the one side of the five-membered ring of the five-membered, N-substituted ring structure is actually formed by the bonding of or joining of the carbonyl groups of the dicarboximide with the two lateral carbon atoms of the lateral benzene ring of the anthraquinone molecule, and as used herein, this is defined as a five-membered, N-substituted dicarboximide ring structure joined to the two outermost or lateral carbon atoms of the lateral benzene ring of the anthraquinone dye. In accordance with the present invention, a dicarboximide group may also be attached to the anthraquinone molecule at the other lateral benzene ring at the outermost (the two lateral) carbon atoms designated as carbon atom number 6 and carbon atom number 7. In accordance with the present invention, there may be two dicarboximide ring structures upon the anthraquinone dye molecule, or there may be only one dicarboximide ring structure at either one of the lateral benzene rings of the anthraquinone-based dye. As used herein, one lateral benzene ring is the benzene ring embracing carbon atoms 1–4, and the other lateral benzene ring is the benzene ring embracing carbon atoms 5–8. There must be at least one dicarboximide group upon the anthraquinone-based dye structure, either at carbon atoms 2 and 3 or at carbon atoms 6 and 7. Any of the numbered carbon atoms in the dye structure shown above may be substituted with various groups and/or radicals as long as there is at least one dicarboximide structure at carbon atoms 2 and 3 or carbon atoms 6 and 7. The major axis referred to above is that line which is drawn through the three adjacent benzene rings in the anthraquinone-based dye structure and which passes through the nitrogen and the "R" substituted upon the nitrogen in the dicarboximide group or groups attached to the lateral benzene rings of the dye molecule. Thus, the major axis passes through the lateral benzene rings between carbon atoms 2 and 3 and between carbon atoms 6 and 7. Various groups which may be substituted in the numbered positions of the molecular structure set forth above and various derivatives thereof are described in more detail below.

These and various other objects, features and advantages of the invention can be best understood from the following detailed description.

The anthraquinone-based dyes of the present invention have the general formula:

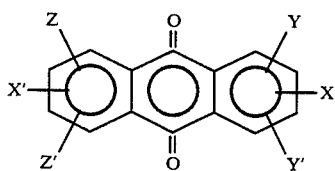

wherein at least one of X and X' is a five-membered ring connected to the lateral benzene ring at the two outermost or lateral carbon atoms upon the lateral benzene rings and designated in the molecular structure as carbon atoms 2 and 3 and carbon atoms 6 and 7. The five-membered ring of the present invention is an N-substituted dicarboximide wherein each of the two carbonyl groups thereof joins or connects the lateral benzene ring at the two outermost or lateral carbon atoms of the lateral benzene rings. The N-substituted five-membered ring of the present invention has the following structure:

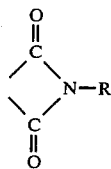

wherein R may be any of various groups or radicals set forth below. As discussed above, either X or X' or both X and X' can be the five-membered dicarboximide ring structure connected to the lateral benzene rings of the anthraquinone-based dye structure. However, in accordance with the present invention, where only one of X or X' is a 5-membered dicarboximide ring attached to a lateral benzene ring of the anthraquinone-based dye, the lateral or outermost carbon atoms of the other lateral benzene ring, that is, carbon atoms 2 and 3 or carbon atoms 6 and 7 of the anthraquinone-based dye structure, may be substituted with hydrogen atoms, or the two positions may be substituted by any of the groups described herein for Y, Y', Z and Z'. Thus, if X represents a 5-membered dicarboximide ring, as in the formula set forth above, X' may also be a 5-membered dicarboximide ring substituted upon the outermost or lateral carbon atoms of the lateral benzene ring, or X' may represent hydrogen atoms substituted upon the lateral or outermost carbon atoms of the lateral benzene ring, or X' may also represent amino groups, alkylamino groups, dialkylamino groups, nitro groups, alkyl radicals having from about 1 to about 4 carbon atoms, substituted alkyl radicals having from about 1 to about 4 carbon atoms, halogen groups, cyano groups, hydroxy groups and combinations thereof substituted upon the lateral carbon atoms of the lateral benzene ring, or if X' is a 5-membered dicarboximide ring upon the lateral benzene ring of the anthraquinone-based dye structure, X may be hydrogen atoms, amino groups, alkylamino groups, dialkylamino groups, nitro groups, alkyl radicals having from about 1 to about 4 carbon atoms, substituted alkyl radicals having from about 1 to about 4 carbon atoms, halogen groups, cyano groups, hydroxy groups and combinations thereof substituted upon the two lateral or outermost carbon atoms of the lateral benzene ring.

In the above general formula, Y, Y', Z and Z' may be any one of the following substituents including hydrogen, amino groups, alkylamino groups, dialkylamino groups, nitro groups, alkyl radicals having from about 1 to about 4 carbon atoms, substituted alkyl radicals having from about 1 to about 4 carbon atoms, halogen groups, cyano groups and hydroxy groups, and they may be substituted at the positions of the benzene ring shown as carbon atoms 1, 4, 5 and 8 in the anthraquinone-based dye molecular structure set forth above. Any of the replaceable hydrogen atoms on the lateral benzene rings of the anthraquinone dye, wherein at least one of the lateral benzene rings has an N-substituted dicarboximide joined to the two outermost carbon atoms to form a 5-membered ring, may be substituted with various substituents normally used in dyes including chromophoric groups, various functional groups and various non-functional groups. Examples of such groups include the atoms, radicals and other groups specified for Y, Y', Z and Z'.

As used herein, and unless otherwise defined, halogen is chlorine, bromine, iodine and fluorine; alkyl is straight chain or branched chain and has from about 1 to about 10 carbon atoms; the alkyl group of alkylamino (monoalkylamino) and dialkylamino has from about 1 to about 4 carbon atoms and may be straight chain or branched chain; aryl is benzene, naphthalene, or anthracene; substituted aryl is any of the foregoing substituted with halogen, nitro, amino, alkyl, cyano and/or hydroxy; arylamino is any of the foregoing amino-substituted aryl compounds; and the alkyl and alkoxy of the alkoxyalkyl are each from about 1 to about 4 carbon atoms.

Examples of various atoms, radicals and groups which may be substituted upon the carbon atoms of the lateral benzene rings as discussed above, include hydrogen; amino (—NH$_2$) groups; monoalkylamino (—NHR) wherein R is an alkyl group having from about 1 to about 4 carbon atoms and includes, for example, monoisopropylamino, monobutylamino, monoisobutylamino, mono-n-propylamino, monoethylamino, monomethylamino, and the like; dialkylamino (—NR$_2$) wherein R is an alkyl group having from about 1 to about 4 carbon atoms and includes, for example, dimethylamino, diethylamino, di-n-propylamino, methylethylamino, ethylbutylamino, di-n-butylamino, and the like; nitro (—NO$_2$); alkyl having from about 1 to about 4 carbon atoms and including methyl, ethyl, n-propyl, isopropyl, n-butyl and isobutyl; substituted alkyl radicals having from about 1 to about 4 carbon atoms and embracing the species described above and their halogen, nitro, cyano and hydroxy derivatives, such as, for example, chloromethyl, bromoethyl, chlorobutyl, fluoropropyl, bromopropyl, nitromethyl, nitroethyl, nitrobutyl, cyanomethyl, cyanopropyl, cyanoisopropyl, hydroxymethyl, hydroxypropyl, 1-hydroxybutyl, 2-hydroxybutyl, and the like; halogen, such as chlorine, fluorine, iodine and bromine; cyano (CN); and hydroxy (—OH).

Examples of the N-substituted groups upon the 5-membered dicarboximide structure shown below:

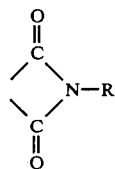

include those species wherein R is an alkoxyalkyl radical, such as, methoxymethyl (—CH$_2$OCH$_3$), methoxyethyl (—CH$_2$CH$_2$OCH$_3$), 3-methoxy-propyl (—CH$_2$CH$_2$CH$_2$OCH$_3$), 4-methoxybutyl (—CH$_2$CH$_2$CH$_2$OCH$_2$CH$_3$), 3-ethoxypropyl (—CH$_2$CH$_2$CH$_2$OCH$_2$CH$_3$), 2-ethoxypropyl (—CH$_2$—CH$_2$(OCH$_2$CH$_3$)—CH$_3$), and the like. R substituted upon the nitrogen atom of the dicarboximide ring structure may also be a straight chain or branched chain alkyl radical having from about one to about ten carbon atoms and includes, for example, methyl, ethyl, propyl, n-butyl, pentyl, hexyl, decyl and the like, and the branched chain alkyl radicals, such as isopropyl, isobutyl, isoamyl, isoheptyl, isononyl and the like. The straight chain alkyl radicals and the branched chain alkyl radicals may also be substituted with halogen atoms such as chlorine, bromine, iodine and fluorine, for example, 3,3-dichloropropyl, 4-bromobutyl, trichloromethyl, 2,2-difluoroethyl, and the like; or they may be substituted with any conventional group which normally replaces hydrogen including nitro, cyano, amino, hydroxy, and the like. R substituted upon the nitrogen of the dicarboximide ring structure may also embrace phenyl radicals and substituted phenyl radicals having the formula:

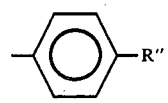

benzyl radicals, and substituted benzyl radicals having the formula:

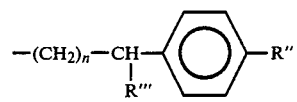

where R″ is in the para-position and may be any of several groups including hydrogen, halogen, such as chlorine and bromine; cyano; nitro, hydroxy, alkyl, substituted alkyl, and the like. R″ may also be straight chain alkyl radical having from about 1 to about 10 carbon atoms; branched chain alkyl radical having from about 1 to about 10 carbon atoms; substituted straight chain or branched alkyl radical having from about 1 to about 10 carbon atoms; amino; alkoxy; alkylamino; dialkylamino; hydroxy; phenol; arylamino; and esters having the formula:

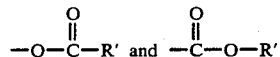

wherein R′ may be alkyl, substituted alkyl, aryl and substituted aryl, the substituted alkyl and substituted aryl being substituted with hydroxy, alkyl, alkoxy, amino, monoalkylamino, dialkylamino, cyano, phenyl, and the like. R‴ can be hydrogen or alkyl having from about 1 to about 3 carbon atoms, and n is an integer from 0 to 5. The alkoxy groups discussed above for R′ and R″ generally include such species as methoxy, ethoxy, propoxy, butoxy, isobutoxy, and alkoxy groups having up to about 10 carbon atoms. The monoalkylamino radicals for R′ and R″ include, for example, monoethylamino, monomethylamino, monopropylamino, monobutylamino, monoisobutylamino, and the like; and the dialkylamino radicals for R′ and R″ include, for example, dimethylamino, diethylamino, methylethylamino, ethylbutylamino, dibutylamino, and the like. The alkyl of the mono- and di- alkylamino groups may be from about 1 to about 10 carbon atoms. The esters discussed above include, for example, methylbenzoate, ethylbenzoate, propylbenzoate, butylbenzoate, octylbenzoate, phenylbenzoate, p-hydroxyphenylbenzoate, ethoxyphenylbenzoate, 3,5-diaminophenylbenzoate, 3,5-dimethylphenylbenzoate, p-ethylphenylbenzoate, monoethylaminophenylbenzoate, dibutylaminophenylbenzoate, cyanophenylbenzoate, biphenylbenzoate, and the like. The straight chain or branched chain substituted or unsubstituted, groups for R′, R″ and R‴ are the same as those previously defined for other substituents, such as Y, Y′, Z and Z′ defined above.

One preferred class of liquid crystal compositions of the present invention comprises a host liquid crystal material; and at least one guest anthraquinone dye dissolved in the host liquid crystal material, the anthraquinone dye having the general formula:

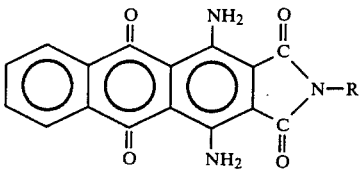

wherein R is the same as defined above and includes: (a) alkoxyalkyl radical; (b) straight chain alkyl radical having from about 1 to about 10 carbon atoms and substituted derivatives, such as, nitro, halogen, amino, cyano and the like, thereof; (c) branched chain alkyl radicals having from about 1 to about 10 carbon atoms and substituted derivatives, such as, nitro, halogen, amino, cyano and the like, thereof; (d) phenyl radicals; (e) benzyl radicals; (f) substituted phenyl radicals; and (g) substituted benzyl radicals, both the phenyl radicals and the benzyl radicals being substituted in the para-position with, for example, halogen groups, cyano groups, nitro groups, amino groups, alkoxy groups, phenol, monoalkylamino groups, dialkylamino groups, straight chain or branched alkyl radicals (substituted or unsubstituted), wherein the alkyl is from about 1 to about 10 carbon atoms, arylamino groups and alkyl esters, substituted alkyl esters, aryl esters, and substituted aryl esters.

Examples of preferred anthraquinone dyes having the preferred general formula as set forth above include, for example, 1,4-diamino-N-(3-methoxypropyl)-2,3-anthraquinone dicarboximide; 1,4-diamino-N-(4-butoxypropyl)-2,3-anthraquinone dicarboximide; 1,4-diamino-N-(3-methoxyethyl)-2,3-anthraquinone dicarboximide; 1,4-diamino-N-(3-ethoxy-propyl)-2,3-anthraquinone dicarboximide; 1,4-diamino-N-(isopropyl)-2,3-anthraquinone dicarboximide; 1,4-diamino-N-ethyl-2,3-anthraquinone dicarboximide; 1,4-diamino-N-butyl-2,3-anthraquinone dicarboximide; 1,4-diamino-N-octyl-2,3-anthraquinone dicarboximide; 1,4-diamino-N-phenyl-2,3-anthraquinone dicarboximide; 1,4-diamino-N-chlorophenyl-2,3-anthraquinone dicarboximide; 1,4-diamino-N-ethylbenzoate-2,3-anthraquinone dicarboximide; 1,4-diamino-N-nitrophenylbenzoate-2,3-anthraquinone dicarboximide; 1,4-diamino-N-(1-methylbenzyl)-2,3-anthraquinone dicarboximide; and 1,4-diamino-N-(1-methylchlorobenzyl)-2,3-anthraquinone dicarboximide; and 1,4-diamino-N-butylphenyl-2,3-anthraquinone dicarboximide.

The 1,4-diamino-2,3-anthraquinone dicarboximides are illustrated and disclosed in U.S. Pat. No. 2,628,963, and two preferred methods of making the 1,4-diamino-2,3-anthraquinone dicarboximides are disclosed therein. The 1,4-diamino-2,3-anthraquinone dicarboximides of U.S. Pat. 2,628,963 wherein the nitrogen atom of the dicarboximide ring structure is substituted with a substituent other than hydrogen, and preferably substituents as disclosed, discussed and defined above, may be used as guest anthraquinone-based dyes in a host liquid crystal material in accordance with the present invention. U.S. Pat. No. 2,628,963 is incorporated herein by reference for its disclosure in preparing the guest anthraquinone-based dyes used in the host liquid crystal materials of the present invention. As disclosed therein, the N-substituted 1,4-diamino-2,3-anthraquinone dicarboximides are prepared by different methods, for example an appropriate 1,4-diamino-2,3-anthraquinone dicarboxamide is heated in concentrated sulfuric acid at temperatures of 75° to 85° C.; then after cooling to a lower temperature, water is slowly added, and as the solution is cooled, crystals separate out which are filtered off. These crystals may be washed in hot water, which converts them from an orange to a blue color. The 1,4-diamino-2,3-anthraquinone dicarboximides may also be prepared from the 1,4-diamino-2,3-anthraquinone dicarbonitriles by heating in concentrated sulfuric acid with the addition of a secondary alcohol, or when the straight 1,4-diamino-2,3-anthraquinone dicarboximide is to be produced, the alcohol is omitted. The 1,4,5,8-tetramino-2,3,6,7-anthraquinone tetracarboximides can be made by substantially the same process described above and in U.S. Pat. No. 2,628,963 using, for example, the appropriate 1,4,5,8-tetramino-2,3,6,7-anthraquinone tetracarboxamide. More specific reaction conditions and details are disclosed in U.S. Pat. No. 2,628,963.

The N-alkyl substituted 1,4-diamino-2,3-anthraquinone dicarboximides are prepared from the 1,4-diamino-2,3-anthraquinone dicarboximide prepared by either of the methods discussed above my mixing the 1,4-diamino-2,3-anthraquinone dicarboximide with an alkylamine solution in methanol, for example, when the N-methyl substituted compound is desired, methylamine solution in methanol is used. When the n-butyl substituted compound is required, n-butylamine solution in methanol is used. The reaction mixture is used in the presence of ortho-dichlorobenzene and methanol and is heated with stirring in an autoclave for about 4 hours at from 175° C. to 180° C. After cooling, the crystals which form are separated and washed with alcohol until the filtrate is almost colorless.

When branched-chain anthraquinones are desired, for example, 1,4-diamino-N-isobutyl-2,3-anthraquinone dicarboximide, the equivalent branched chain alkylamine, isobutylamine, is used in the foregoing process. Likewise, benzylamine is used in the foregoing reaction and process when 1,4-diamino-N-benzyl-2,3-anthraquinone dicarboximide is desired. N-alkoxyalkyl substituted anthraquinone dicarboximides are obtained by using the desired alkoxyalkylamine, for example, methoxypropylamine, ethoxyethylamine, and the like in the foregoing process. When the corresponding N-substituted phenyl radical is desired in the nitrogen-substituted dicarboximide, the corresponding aniline is used, for example, aniline, dichloroaniline, para-cyanoaniline, para-nitro-aniline, para-hydroxyaniline, para-propoxyaniline, para-phenylenediamine, paraethylamino aniline, 3,5-dimethylamino aniline, p-toluidine, para-ethyl aniline, 3,5-dipropyl aniline and the like.

In other embodiments, the esters of 1,4-diamino-N-phenyl-2,3-anthraquinone dicarboximide and the 1,4-diamino-N-benzyl-2,3-anthraquinone dicarboximide are prepared by reacting the appropriate chloride with 1,4-diamino-N-phenyl-2,3-anthraquinone dicarboximide and 1,4-diamino-N-hydroxybenzyl-2,3-anthraquinone dicarboximide respectively, to form the corresponding ester. For example, 1,4-diamino-N-phenyl-2,3-anthraquinone dicarboximide is reacted with hexyloxybenzoyl chloride to form the corresponding ester, 1,4-diamino-N-phenylhexyloxybenzoate-2,3-anthraquinone dicarboximide. Various other alkyl esters, substituted alkyl esters, aryl esters and substituted aryl esters may be substituted upon the nitrogen-substituted phenyl radical and the N-benzyl substituted radical, for example, methylbenzoate, ethylbenzoate, and other esters of the substituted phenyl radical having the formula:

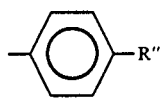

and the substituted benzyl radical having the formula:

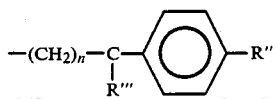

where R″ is in the para-position and is an ester having the formula:

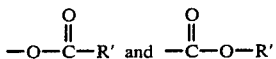

wherein R′ is selected from the group consisting of alkyl, substituted alkyl, aryl and substituted aryl, and R‴ is hydrogen or alkyl having from about 1 to about 3 carbon atoms, and n is an integer from about 0 to about 5.

Other 1,4-diamino-N-substituted-2,3-anthraquinone dicarboximides and the method of making said dicarboximides are disclosed in U.S. Pat. No. 2,628,963, and one skilled in the art can easily substitute any conventional compound upon the nitrogen atom of the dicarboximide ring structure upon the lateral benzenes of the anthraquinone molecule of the 1,4-diamino anthraquinone compound or any of the other equivalent compounds of the present invention. The method of preparing the N-substituted anthraquinone dicarboximides is not critical in the practice of the present invention, and one skilled in the art can easily adapt common reaction processes and mechanisms for substituting various positions upon the anthraquinone molecular structure and upon the nitrogen atoms in the dicarboximide upon the lateral benzene ring or lateral benzene rings of the anthraquinone dye molecule.

It is also within the purview of one skilled in the art to substitute various functional groups, non-functional groups, and chromophoric groups for hydrogen atoms upon the basic molecular structure of anthraquinone, that is, various functional groups, non-functional groups and/or chromophoric groups may be substituted for X, X′, Y, Y′, Z and/or Z′ when at least one X or X′ is a 5-membered ring connected to the benzene ring at the two outermost or lateral carbon atom positions (numbered positions 2 and 3 and/or 6 and 7 of the lateral benzene rings of the anthraquinone molecule), the five-membered ring having the basic dicarboximide structure and the carbonyl groups of the dicarboximide being bonded to the two adjacent lateral positions upon the lateral benzene ring of the anthraquinone molecule. Conventional reactions, reaction mechanisms, processes and reagents known to those skilled in the art, can be used to incorporate such groups upon the anthraquinone molecule at the designated positions, namely, carbon atoms 1-8 as numberer in the general formula.

The anthraquinone-based dyes having the 5-membered, nitrogen-substituted dicarboximide ring structure can be used in any conventional manner. However, in certain cases they are not used alone in liquid crystal compositions and may be used as a plurality of dyes and/or in combination with other dyes, modifiers or adjuvants. Because certain of the dyes have relatively low solubility in the liquid crystals, the dyes are not used by themselves in liquid crystal displays, however, the dyes are useful as additives in conjunction with other dyes to improve the color of, for example, black, green and blue displays. Accordingly, the anthraquinone-based dyes of this invention are used with liquid crystal host materials well-known in the art to improve the color of the liquid crystal composition for use in a liquid crystal display. When the anthraquinone-based dyes of this invention are used with a liquid crystal host, they are called guest dyes and they are dissolved in the host liquid crystal material, that is, the guest anthraquinone-based dye is soluble in the host liquid crystal material. Many of the anthraquinone-based dyes used in accordance with the present invention require mild heat, for example, above ambient to about 110° C. to promote their dissolution in the host liquid crystal.

In accordance with the present invention, it is not critical how much of the dye is present in the host liquid crystal as long as the dye is soluble therein. In preferred embodiments, about 0.05% by weight to about 1.0% by weight, and more preferably about 0.1% by weight to 0.5% by weight, based upon the weight of the liquid crystal host material, of the dye of this invention or mixtures of dyes of this invention are present in the host liquid crystal. One skilled in the art can adjust the amount of anthraquinone-based dye having at least one 5-membered, N-substituted dicarboximide structure upon the anthraquinone molecule as desired and can determine the maximum solubility of the dye and/or the amount required for maximum absorption at the wavelengths above 650 nm. The upper limit of the amount of dye varies with the solubility of the particular dye in the host liquid crystal. The amount of guest dichroic anthraquinone-based dye of the present invention in the host liquid crystal material is that amount up to the limit of maximum solubility in the host of the anthraquinone-based dye required to color, tint or shade the host liquid crystal, required to add to the blue color of the host liquid crystal material, or required to contribute to the color of a mixture of dyes used in the host liquid crystal material, e.g., the use of the blue anthraquinone-based dye or dyes of this invention with dyes of other colors to improve the black, blue, green or other color of guest dyes in the host liquid crystal.

The guest anthraquinone-based dichroic dyes of this invention are particularly useful in black liquid crystal displays because improved black liquid crystal materials can be obtained by mixing dichroic dyes of various colors in proper proportions to obtain a material which absorbs radiation in the spectral range of about 400–700 nm, and the anthraquinone-based dyes of this invention substantially improve the absorption in the 650–700 nm region (the red region) of such dye mixtures. Thus, in accordance with the present invention, improved black, green and blue dichroic liquid crystal displays, for example, are achieved by providing a host liquid crystal material and mixing therewith dichroic dyes of various colors in suitable proportions to obtain a material which absorbs radiation in all or part of the spectral range of about 400–700 nm, wherein the dichroic dyes of various colors include a dye having the general formula:

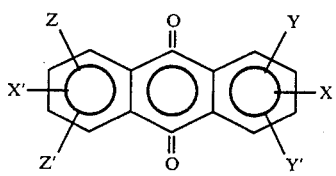

wherein X, X', Y, Y', Z and Z' are the same as defined above, and wherein at least one of X and X' is a 5-membered ring connected to the benzene ring at the lateral positions 2 and 3 and/or 6 and 7 of the lateral benzene rings in the anthraquinone molecule, said 5-membered ring having the structure

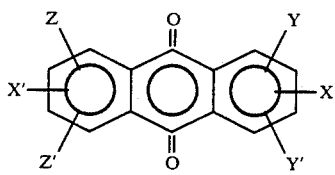

wherein R is the same as defined above. The suitable proportions of various dyes can be easily determined by one skilled in the art. Examples of suitable proportions of various dyes to form various colors are shown below where Examples 1, 3, 4 and 8 illustrate various dyes in designated proportions to produce black colored compositions; Example 5 illustrates various dyes in designated proportions to produce a blue colored composition; Example 6 illustrates various dyes in designated proportions to produce a violet colored composition; and Example 7 illustrates various dyes in designated proportions to produce a green colored composition.

The appropriate mixture of dichroic dyes of various colors in suitable proportions to obtain a material which absorbs radiation in the spectral range of about 400–700 nm, and which approaches a substantially black appearance in color, is within the purview of one skilled in the art, and the improvement of the present invention is directed to the use of one or more of the anthraquinone-based dyes having the designated 5-membered, N-substituted dicarboximide ring structure to improve the "blackness" of the dichroic dye mixture in a liquid crystal display made from various colors. The greenish color of green dyes and the bluish color of blue dyes, and the like, are also improved from the use of the anthraquinone-based dyes of the present invention in a liquid crystal. When about 0.5% to about 1.0% or higher by weight of the blue anthraquinone-based dyes of this invention are used with about 0.5% to about 1.0% or higher by weight of other dichroic dye or dyes, the colors of the liquid crystal displays are substantially improved in a biphenyl liquid crystal, and depending upon the relative amounts of dyes used, displays of various shades and colors of green, blue and black are obtained including greenish-black, blue-black, grey-black and greenish-blue, and there is little or no reddish tint or color in such displays. The anthraquinone-based dyes of this invention used in such mixtures have substantially high order parameter (S), generally at least above 0.60, to ensure satisfactory brightness and contrast ratio. As indicated above, order parameters higher than 0.60 are not frequently achieved in liquid crystal compositions when dyes having maximum absorption peaks above 650 nm are dissolved therein.

Any liquid crystal host material may be used in accordance with the present invention. In those embodiments of the present invention wherein the anthraquinone-based dichroic dye material having at least one 5-membered, N-substituted dicarboximide ring structure thereon, is used as a guest dye in a host liquid crystal material, it is not critical which of the many well known liquid crystal materials or combinations thereof may be used as long as the anthraquinone-based dye materials of the present invention are soluble in the host liquid crystal material and as long as the anthraquinone-based dye or dyes of the present invention are compatible with or have no adverse effect upon the host liquid crystal material. In preferred liquid crystal compositions of the present invention, the host liquid crystal material is a nematic liquid crystal of positive or negative dielectric anisotropy, a cholesteric liquid crystal of positive or negative dielectric anisotropy and mixtures thereof, that is, mixtures of nematic liquid crystals and cholesteric liquid crystals modified with other optically active compounds.

Any conventional liquid crystal host material can be used with the anthraquinone-based dyes of the present invention. The liquid crystal hosts can be selected by one skilled in the art depending upon the electro-optic effect to be utilized. Nematic liquid crystals include the biphenyl liquid crystals such as E7 and E8 from BDH, Ltd., phenylcyclohexanes and azoxy mixtures available from E. Merck Co., alkoxybenzylidene anils such as those having the structural formula:

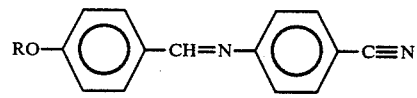

wherein OR is an alkoxy radical preferably having from 1 to 7 carbon atoms or an acyloxy radical having from 2 to 7 carbon atoms, p-anisylidene-p'-n-butylaniline, p-anisylidene-p'-aminophenylbutyrate, p-(p'-methoxyphenylazoxy)butylbenzene, p-(p'-ethoxyphenylazo) phenylheptanoate, p-n-hexylbenzoic acid-p'-n-hexyloxyphenyl ester, and other liquid crystal materials, such as the esters disclosed in U.S. Pat. No. 3,984,344, p-n-hexylbenzylidene-p'-aminobenzonitrile, p-capryloxybenzylidene-p'-aminobenzoitrile, p-cyanophenyl-p'-n-heptylbenzoate, p-cyanobenzylidine-p'-n-butoxyaniline, p-cyanobenzylidene-p'-amino-phenylvalerate, p-azoxyanisole, butyl-p-(p'-ethoxyphenoxy-carbonyl)phenylcarbonate, p(p'-ethoxyphenylazo)phenylheptanoate, and the like. Another class of liquid crystal materials have the general formula:

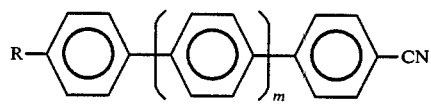

wherein R is an alkyl or alkoxy group and m=0 or 1, at least one of said compounds being cyanobiphenyl wherein m=0. Generally, nematic liquid cystals fall within the class of chemical compounds having the general formula:

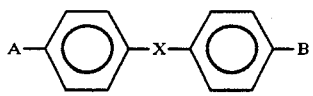

wherein X is an azomethine linkage of the Schiff base class, X is an ester, vinylene, acetylene, azo or azoxy, or X is merely a single bond connecting the two benzene rings; and A and B are $C_nH_{2n+1}$ (alkyl group); $C_nH_{2n+1}O$ (alkoxy group); or $C_nH_{2n+1}COO$ (ester group). Cholesteric liquid crystals can be pure compounds such as derivatives of cholesterol or noncholesteric materials. These are characterized by optical activity arising from the absence of molecular symmetry.

Examples of specific commercial nematic liquid crystals include E-7 from BDH Chemicals wherein the chemical structure is of the biphenyl type, and the temperature range is −10° to 60° C. with a dielectric anisotropy of 11; E-8 from BDH Chemicals having a basic chemical structure of the biphenyl type with a temperature range of about −10° to 70° C. with a dielectric anisotropy of 13; Licristal 1132 from E. Merck of the phenylcyclohexane type having a temperature range of −6° to 70° C. with a dielectric anisotropy of 10; Licristal 1221 from E. Merck of the phenylcyclohexane type having a temperature range of −10° to 90° C. with dielectric anisotropy of 8; ROTN-103 from Hoffman-LaRoche of the ester type having a temperature range from about −10° to 80° C. with dielectric anisotropy of 26; ROTN-200 from Hoffman-LaRoche of the Schiff base type having a temperature range of about −15° to 65° C. with a dielectric anisotropy of 18; and ROTN-404 from Hoffman-LaRoche of the biphenyl-pyrimidine type having a temperature range from about −10° to 105° C. and a dielectric anisotropy of 21.

The following examples further illustrate the practice of the invention, and they are meant to be exemplary only and are not to be construed as to limiting the invention in any way.

The following examples illustrate the use of the anthraquinone-based dyes in two types of liquid crystal displays having two different liquid crystal hosts. In one type of liquid crystal display used to demonstrate the present invention, the liquid crystal host was a cholesteric liquid crystal. In the other type of liquid crystal display, the anthraquinone-based dyes were dissolved in a nematic liquid crystal. In both cases, the resulting cholesteric or nematic liquid crystal composition was sandwiched between conductive glass plates in test cells whose surfaces are in contact with the solution, the surfaces having been previously rubbed unidirectionally. The test cells are conventional liquid crystal cells having a distance of about eighteen microns between the plates and a polarizer external to the cell. The boundary condition inside the cell is homogeneous. When illuminated, the display switches from a particular color, for example, green, blue, or black, in the absence of an applied voltage to substantially colorless in the presence of a voltage.

EXAMPLE 1

A black composition was prepared by mixing 2.85 grams of a biphenyl-pyrimidine type liquid crystal having a temperature range from about −10° to 105° C. identified as ROTN-404 from Hoffman-LaRoche Company, 0.15 gram of an optically active chiral dopant identified as CB-15, 0.0025 gram of blue dye 4,4'-bis(4-N-ethylaminonaphthylazo)azobenzene, 0.01 gram of blue dye 4,4'-bis[2,5-dimethyl-4-(4-ethylaminonaphthylazo)phenylzao]azobenzene, 0.025 gram of blue dye 4,4'-bis(4-ethylaminonaphthylazo)-2-methyl-5-methoxyazobenzene, 0.0025 gram of yellow dye 4,4'-bis(4-N,N-diethylaminobenzalamino)azobenzene, 0.0075 gram of yellow dye 4,4'-bis(4-N,N-dimethylaminobenzalamino)azobenzene; and 0.0025 gram of an anthraquinone-based dye having a 5-membered, N-substituted dicarboximide. CB-15 is 4-cyano-4'-(2-methyl) butylbiphenyl having the formula:

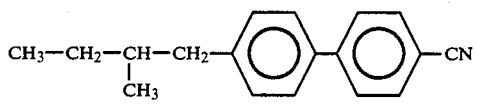

The anthraquinone-based dye used in this example was 1,4-diamino-N-(3-methyoxypropyl)-2,3-anthraquinone dicarboximide having the formula:

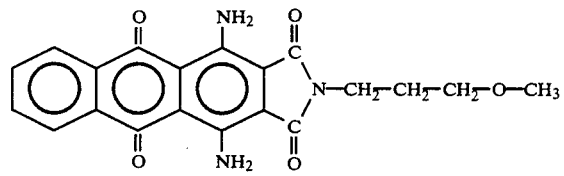

available commercially under the trade name Genacron Brilliant Blue 8G and supplied by BASF - Wyandotte.

The composition made with the dyes specified above was placed in a conventional liquid crystal test cell as described above and having a spacing between the plates of about 18 microns. In the absence of voltage, the color of the display was neutral black. When a voltage of about 15 volts was applied to the test cell, the neutral black material turned substantially colorless.

The order parameter of 1,4-diamino-N-(3-methoxypropyl)-2,3-anthraquinone dicarboximide was measured in liquid crystal E-7 described above and commercially available from BDH Chemicals Company and was determined to be 0.66. The order parameter of the same dye was 0.71 in ROTN-404 described above and commercially available from Hoffman-LaRoche. The maximum absorption peak was at 675 nm in both E-7 and ROTN-404.

EXAMPLE 2

A formulation was prepared as in Example 1 above without the anthraquinone-based dye. When the composition was viewed in incandescent light or daylight, the formulation had a reddish hue.

EXAMPLE 3

A blue anthraquinone-based dye, 1,4-diamino-N-isopropyl-2,3-anthraquinone dicarboximide having the formula:

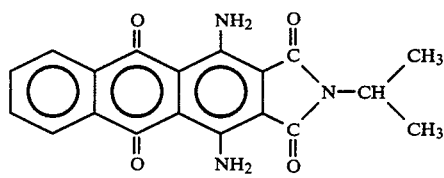

was made by the procedure described in Example 6 of U.S. Pat. No. 2,628,963.

A formulation identical to that disclosed in Example 1 above was made with this blue dye in place of the 1,4-diamino-N-(3-methoxypropyl)-2,3-anthraquinonedicarboximide dye of Example 1. Substantially similar results were obtained when the blue dye of this example replaced the dye of Example 1. There was good dichroism in liquid crystal E-7 with the blue dye of this example, however, it was also noted that there was low solubility of the blue dye of this example in the liquid crystal formulation. The order parameter of the dye of this example was estimated between about 0.60 and 0.65 in liquid crystal mixture E-7 and in liquid crystal mixture ROTN-404, and the absorption peaks were at 675 nm.

EXAMPLE 4

Another dye, 1,4-diamino-N-(α-methylbenzyl)-2,3-anthraquinone dicarboximide, having the formula:

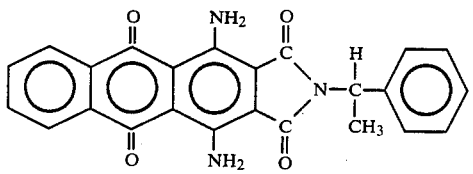

was made in accordance with the procedure described in Example 3 using α-methylbenzyl alcohol instead of the isopropyl alcohol of Example 3. This anthraquinone-based dye was substituted for the anthraquinone-based dye in Example 1 above, and substantially the same results were obtained using the dye of Example 4.

The order parameter of the blue dye of this invention was estimated at between about 0.60 and 0.65, and the absorption peaks were at about 675 nm. Although there was limited solubility of the dye of this example in the liquid crystal formulation of Example 1, there was a definite improvement in the color of the formulation when the dye was used.

EXAMPLE 5

Blue liquid crystal compositions were prepared by mixing 2.85 grams of ROTN-404, 0.15 gram CB-15, 0.015 gram of purple dye 4,4'-bis-(N,N-diethylamino-2-methylphenylazo)azobenzene and 0.0045 gram of the anthraquinone-based dye used in Example 1 above. The formulation was placed in a conventional test cell, and in the absence of a voltage, the color of the liquid crystal composition was blue. When a voltage of about 15 volts was applied, the liquid crystal composition turned substantially colorless. When the anthraquinone-based dye was omitted from the formulation, the display had a purple color which was less pleasing than the blue color obtained with the blue dye.

Substantially similar results were obtained when the anthraquinone-based dye of Example 1 was replaced with the anthraquinone-based dye of Example 3, and when the anthraquinone-based dye was replaced with the anthraquinone-based dye of Example 4.

EXAMPLE 6

As in the preceeding examples, a cholesteric liquid crystal composition having a violet color was prepared by mixing one gram of ROTN-404, 0.05 gram of CB-15, 0.05 gram of orange-red dye 4-(4-dimethylaminophenylazo)azobenzene produced by BDH Chemicals Company and 0.005 gram of the anthraquinone-based dye used in Example 1 above. The violet-colored formulation became substantially colorless when an electric field was applied to a conventional test cell containing the formulation of this example. When the anthraquinone-based dye was omitted, the color of the formulation was orange-red when an electric field was applied to the cell containing the composition.

Substantially similar results were obtained when the anthraquinone-based dye of Example 3 replaced the anthraquinone-based dye of Example 1, and when the anthraquinone-based dye of Example 4 replaced the anthraquinone-based dye of Example 1.

EXAMPLE 7

A cholesteric liquid crystal composition having a green color was prepared by mixing 1.0 gram of ROTN-404 described above, 0.05 gram of CB-15, 0.005 gram of yellow dye 4,4'-bis(4-N,N-dimethylaminobenzalamino)azobenzene and 0.005 gram of the anthraquinone-based dye of Example 1. When a voltage of about 15 volts was applied to the green formulation of this example, the green formulation turned substantially colorless. When the anthraquinone-based dye of this example was replaced with one of the blue dyes in Example 1 above, such as blue dye 4-4'-bis(4-N-ethylaminonaphthylazo)azobenzene, the formulation gave an unsatisfactory green color.

Substantially similar results were obtained when the anthraquinone-based dye of Example 1 was replaced by the anthraquinone-based dye of Example 3 in the formulation of this example, and when the dye of Example 1 was replaced with the dye of Example 4 in the formulation of this example.

EXAMPLE 8

This example demonstrates the use of the anthraquinine-based dyes of this invention in a nematic liquid crystal host. A black liquid crystal composition was prepared by mixing ten grams of phenylcyclohexane nematic liquid crystal supplied commercially as Licristal 1291 by E. Merck Company, 0.01 grams of blue dye 4,4'-bis(4-N-ethylaminonaphthylazo)azobenzene, 0.038 gram of blue dye 4,4'-bis[2,5-dimethyl-4-(4-ethylaminonaphthylazo)phenylazo]azobenzene, 0.008 gram of yellow dye 4,4'-bis(4-N,N-diethylaminobenzalamino)azobenzene, 0.03 gram of yellow dye 4,4'-bis(4-N,N-dimethylaminobenzalamino)azobenzene and 0.01 gram of the anthraquinone-based dye of Example 1. The formulation was placed in a conventional test cell having a distance of about 18 microns between the glass plates, the inner surfaces of which had been rubbed unidirectionally to control the alignment of the liquid crystal. A single polarizer was attached to the cell. The resulting black display turned substantially colorless when a voltage of about 15 volts was applied thereto. When the anthraquinone-based dye was omitted from the formulation, the black color of the formulation had a reddish tint when viewed in daylight or incandescent light.

Substantially similar results were obtained when the anthraquinone-based dye of Example 3 was used in place of the anthraquinone-based dye of Example 1 in the formulation of this example. Substantially similar results were obtained when the anthraquinone-based dye of Example 4 was used in place of the anthraquinone-based dye of Example 1 in this example.

EXAMPLE 9

Other blue dyes having a 5-membered, N-substituted dicarboximide ring structure joined to the anthraquinone molecule in the 2 and 3 position and having the formula:

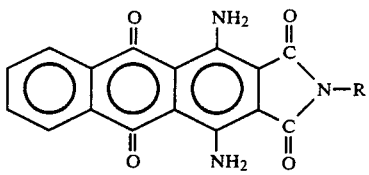

were prepared for testing and are shown in Table 1 below. The dyes were prepared in accordance with the procedure described in U.S. Pat. 2,628,963. R and the amine from which R is derived in the reaction mixture, that is, the corresponding amine, are shown in Table 1 along with the data collected and observed from each of the blue anthraquinone-based dyes.

TABLE 1

| DYE NO. | R | CORRESPONDING AMINE | OBSERVED DATA |
|---|---|---|---|
| 1 | cyclohexyl | cyclohexylamine | S = 0.73 in Licristal 1291<br>S = 0.73 in ROTN-404 |
| 2 | —CH$_2$—CH$_2$—C$_6$H$_5$ | 1-phenyl-2-aminoethane | |
| 3 | —C$_8$H$_{17}$ | n-octylamine | S = 0.64 in ROTN-404<br>S = 0.54 in E-7 |
| 4 | —C$_6$H$_4$—OH | p-aminophenol | S = 0.69 in Licristal 1291 |
| 5 | —C$_6$H$_{13}$ | n-hexylamine | S = 0.66 in Licristal 1291 |
| 6 | —C$_6$H$_5$—O—C(O)—C$_6$H$_5$ | p-aminophenylbenzoate | S = 0.77 in ROTN-404<br>λ max = 682 nm |
| 7 | —C$_6$H$_5$—O—C$_6$H$_{13}$ | p-hexyloxyaniline | S = 0.74 in Licristal 1291<br>λ max = 684 nm |

In accordance with the present invention, black and colored dichroic liquid crystal displays having improved absorption at the 600–700 nm range have been prepared and demonstrate superior color balance in daylight and incandescent light over the prior art dyes. Black liquid crystal displays, blue liquid crystal displays, green liquid crystal displays, and other colors of liquid crystal displays have been prepared with the anthraquinone-based dyes of the present invention wherein a 5-membered, N-substituted dicarboximide ring structure joins the anthraquinone molecule in the lateral carbon atom positions of the lateral ring or rings of the anthraquinone molecule to improve the color of the display. Black and blue displays have been prepared without the customary reddish hues. Green displays have been prepared with a more pleasing green appearance. Violet-colored liquid crystal displays have been prepared without the customary orange-red hues.

While other modifications of the invention and variations thereof which may be employed within the scope of the invention, have not been described, the invention is intended to include such modifications as may be embraced within the following claims.

What is claimed is:

1. A liquid crystal composition comprising a host liquid crystal material and a guest anthraquinone dye having the formula

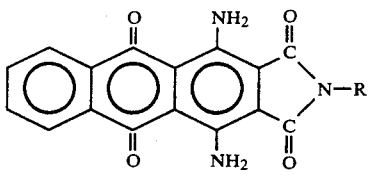

wherein R is a member selected from the group consisting of an alkoxyalkyl radical having from 1 to 4 carbon atoms in the alkyl and the oxyalkyl segment, and a straight chain alkyl or substituted alkyl radical having from about 1 to 10 carbon atoms.

2. A method of improving the color of dichroic dyes for use in liquid crystal displays comprising adding to a host liquid crystal material, a dye composition having a mixture of dichroic dyes of various colors in proper proportion to obtain a material which absorbs radiation in at least part of the spectral range of about 400–700 nm wherein at least one of the dichroic dyes of various colors is an anthraquinone-based dye having at least one lateral 5-membered, N-substituted dicarboxyimide ring joined to the outermost carbon atoms having the formula

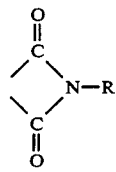

where R is a member selected from the group consisting of an alkoxyalkyl radical having from 1 to 4 carbon atoms in the alkyl and oxyalkyl segment and a straight chain or branched chain alkyl radical having from 1 to about 10 carbon atoms.

3. Liquid crystal mixture intended for electro-optical displays having no polarizers, consisting of:
   a nematic liquid crystal as the host phase,
   an optically acitve additive to give the host phase a cholesteric structure, and at least one pleochroic anthraquinone dye as the guest phase dissolved in the host phase, said anthraquinone dye having the formula

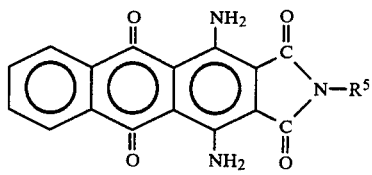

wherein $R^5$ is a member selected from an alkyloxyalkyl radical having from 1-4 carbon atoms in the alkyl and the oxyalkyl segment and an alkyl radical having from 1-10 carbon atoms.

4. A mixture of claim 3 wherein $R^5$ is

—(CH$_2$)$_3$OCH$_3$.

5. The liquid crystal composition of claim 1, wherein the anthraquinone dye is 1,4-diamino-N-(3-methoxypropyl)-2,3anthraquinone dicarboximide.

6. The liquid crystal composition of claim 1, wherein the anthraquinone dye is 1,4-diamino-N-isopropyl-2,3-anthraquinone dicarboximide.

7. The liquid crystal composition of claim 1, wherein the anthraquinone dye is 1,4-diamino-N-hexyl-2,3-anthraquinone dicarboximide.

8. The liquid crystal composition of claim 1, wherein the anthraquinone dye is 1,4-diamino-N-octyl-2,3-anthraquinone dicarboximide.

9. The method of claim 2, wherein about 0.05% to about 1.0% by weight of the anthraquinone-based dye is added to the host liquid crystal material and the dichroic dyes of various colors.

10. The method of claim 2, wherein the mixture is heated at about 60° C. to about 105° C. to dissolve the dichroic dyes in the host material.

11. The method of claim 2, wherein the color of the dichroic dyes is black, and the guest anthraquinone-based dye improves the black color of the dichroic dyes.

12. The method of claim 2, wherein the color of the dichroic dyes is blue, and the guest anthraquinone-based dye improves the blue color of the dichroic dyes.

13. The method of claim 2, wherein the color of the dichroic dyes is green, and the guest anthraquinone-based dye improves the green color of the dichroic dyes.

* * * * *